INVENTOR.
THOMAS F. LILLY
BY J.H.Weatherford
Atty.

Dec. 9, 1947.  T. F. LILLY  2,432,201
TRANSMISSION
Filed May 17, 1943  7 Sheets-Sheet 3

INVENTOR.
THOMAS F. LILLY
BY J.H. Weatherford
Atty.

Dec. 9, 1947. T. F. LILLY 2,432,201
TRANSMISSION
Filed May 17, 1943 7 Sheets-Sheet 5

INVENTOR.
THOMAS F. LILLY
BY J. H. Weatherford
Atty.

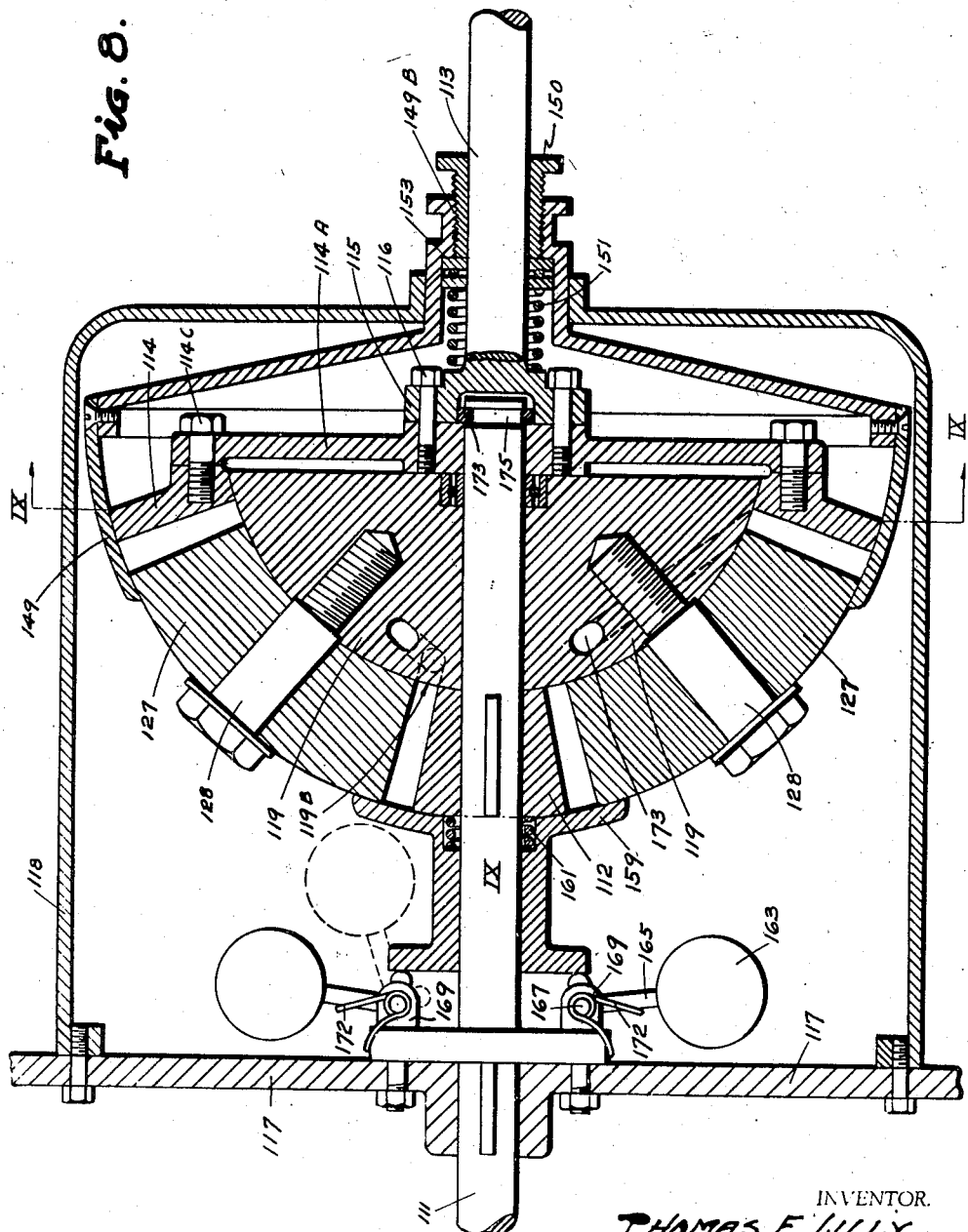

Dec. 9, 1947.  T. F. LILLY  2,432,201
TRANSMISSION
Filed May 17, 1943  7 Sheets-Sheet 7

INVENTOR.
THOMAS F. LILLY
BY J.H. Weatherford
Atty.

Patented Dec. 9, 1947

2,432,201

UNITED STATES PATENT OFFICE 2,432,201

TRANSMISSION

Thomas F. Lilly, Memphis, Tenn.

Application May 17, 1943, Serial No. 487,231

28 Claims. (Cl. 192—61)

This invention relates to improvements in hydraulic clutches and transmission mechanism, and more particularly to a novel combination clutch and transmission especially adapted for use in motor vehicles.

It particularly relates to a device of the general type shown in my previous patent, No. 1,834,626, in which power is transmitted from a driving shaft to an alined driven shaft through intermeshing gears which function as hydraulic pumps, the discharge of fluid from which is controlled directly at the point of discharge exit of the fluid from the intermeshing teeth of the gears in such manner as to either lock the gears against relative rotation or to allow them to rotate at varying speeds relative to one another.

It will be seen that if discharge is entirely prevented in such a device the two shafts are locked together and must turn at the same speed and function as a unitary structure without frictional resistance. It will further be seen, if escape of the pump expelled fluid can be controlled properly the driving shaft may overrun the driven shaft and speed reduction of the driven shaft be accomplished from the speed of the driving shaft by infinitesimal decrements until the driven shaft ceases to turn, or conversely, which is in practice the desired sequence, the speed of a stationary driven shaft normally at rest may be brought up by opposite increments to the speed of the driving shaft.

It will be noted that, particularly in building up speed any internal friction in the apparatus materially aids in the accomplishment of the purposes desired and that no losses are incurred by reason of such friction.

In bringing the driven shaft from rest up to driving shaft speed, it is obvious that a much greater torque should be exerted on the driven shaft than is delivered by the driving shaft. In operation the torque on the driven shaft is very great when the driven shaft is at rest and as the speed of the driven shaft is built up decreases in proportionate ratio as the shaft speeds approach equality until it becomes the same as that of the driving shaft when it reaches the same speed.

This effect was noticeably secured in my previous device, as shown in the patent heretofore referred to, which at intermediate and higher speeds of the driven shaft has proved eminently satisfactory, but below intermediate speeds the torque build-up on the driven shaft has been less than could be desired, apparently partly because of the fact that the driving and driven elements at the point of application of the power are of the same diameter and partly because of failure to realize that torque on the driven shaft might be largely increased by the design of the teeth of the meshing gears, and introduction of reduction gearing.

The objects of the invention are:

To provide a mechanism for the transmission of power in which the torque delivered to a driven shaft by a driving shaft increases in proportion to the divergence of speeds of rotation of the two shafts;

To provide a transmission in which the transmission of power is effected from a pinion on the driving shaft through intermediate gearing to a gear of much larger size relatively to the pinion and hydraulic control is introduced, to effect a torque increasing drive;

To provide a transmission including intermediate gearing carried by a floating hub;

To provide a transmission including intermediate gearing carried by a floating hub in which the relative rotation of the gears is hydraulically controlled;

To provide a transmission using gearing and hydraulic control to build up multiple torque at relatively low speeds of the driven shaft;

To provide a transmission using hydraulically controlled gearing and including booster flow of fluid to increase torque of the driven member relatively to the driving member;

To provide a transmission in which increase or decrease of torque is automatically responsive to the load factors;

To provide a transmission including gearing in which fluid is confined between the gearing teeth to build up multiple torque in which the configuration of the teeth of the gears assist in confining the fluid and in resisting centrifugal throw thereof;

To provide a transmission using gearing and an interposed fluid in which the relative size of the tooth spaces of the driving and driven members are effective to increase torque effect of the driving gears on the driven gears;

To provide a device of the character described in which the delivery of torque from the driving shaft to the mechanism is automatically discontinued at low speeds of the driving shaft and is rendered operative by centrifugal action at and above a predetermined speed of such shaft;

To provide in a mechanism of the character described, including a pinion secured on the driving shaft and a driven gear of relatively much larger diameter secured on a driven shaft and an intermediate floating assembly interconnecting the driving pinion and the driven gear and hydraulically controlled to effect relative speed relations of the driving shaft and driven shaft and delivery of increased torque to the driven shaft;

To provide a mechanism of the character described in which increased torque is delivered from the driving shaft to a driven shaft in automatic response to torque resistance of the driven shaft;

To provide in such a mechanism a tooth relation between meshing gears effective to improve and augment torque delivery between driving and driven gears.

In accomplishing these objects:

To produce a hydraulic torque advantage I use means to unbalance the pumping element, allowing the driven member to handle more fluid than the driving member. The torque advantage will equal the difference of the volume of fluid handled by each member.

This can be done either by cutting off the tops of the teeth of the driving member, or by changing the relative sizes of the teeth of the two fluid carrying members so that the driven member carries more fluid than the driving member.

To produce mechanical torque advantage, I use a driving member, a driven member and a floating member carrying reductive transmission gearing stabilized against said driven member. This mechanical advantage becomes automatic functioning more or less as the load factor increases or decreases.

Combining the mechanical and hydraulic features secures the following advantages:

First, the pressure of the fluid is not required to produce all the power or torque. The teeth of the pinion in the driving member actually turn the driven member. The fluid is used only to block the rotation of the gears; therefore, the pressure on the fluid is considerably less than if the fluid only had all the work to do.

Second, a large diameter gear can be used on the driven member, thereby multiplying the leverage and decreasing fluid pressure per square inch.

Third, the power is applied at several points at the circumference of the large gear, greatly reducing the functional loss as all power is applied directly to the periphery of the large gear, distributed around the entire circumference, making a perfect torque.

Fourth, as only a very small amount of fluid, comparatively, is compressed, and for only a very short time, excessive heating does not develop as the amount of fluid at any time under compression is very small in comparison to the volume available in the chamber.

Fifth, the confining cup contributes to the quickest possible relief.

Sixth, by alternate gear relations almost any multiple of torque can be had.

Seventh, its construction admits of the least possible amount of space and still is the most sturdy construction.

The means by which the foregoing and other objects are accomplished, and the manner of their accomplishment, will be readily understood from the following specification upon reference to the accompanying drawings, in which:

Figs. 1 to 4 inclusive show one form of the device, and Figs. 5, 8 and 9 a modified form of the device.

Figure 3:
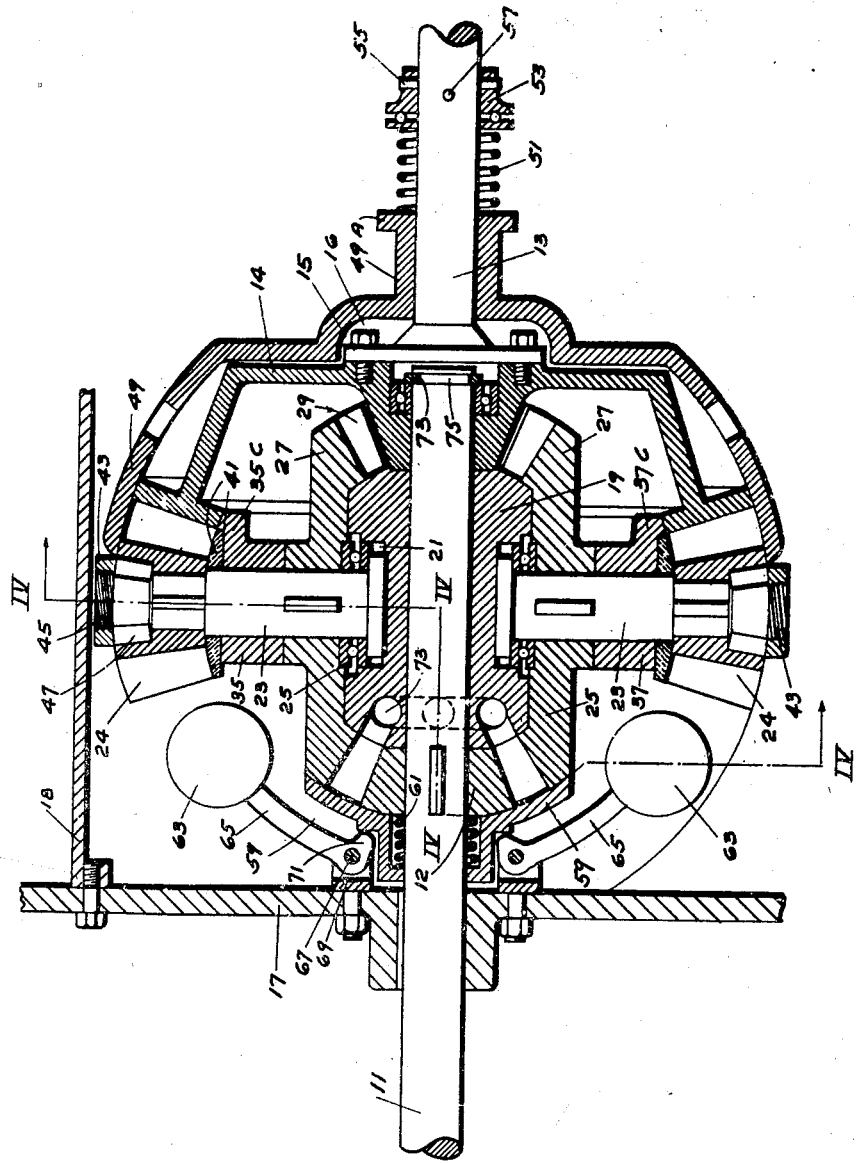
Fig. 3 is a corresponding sectional elevation.
Figure 4:
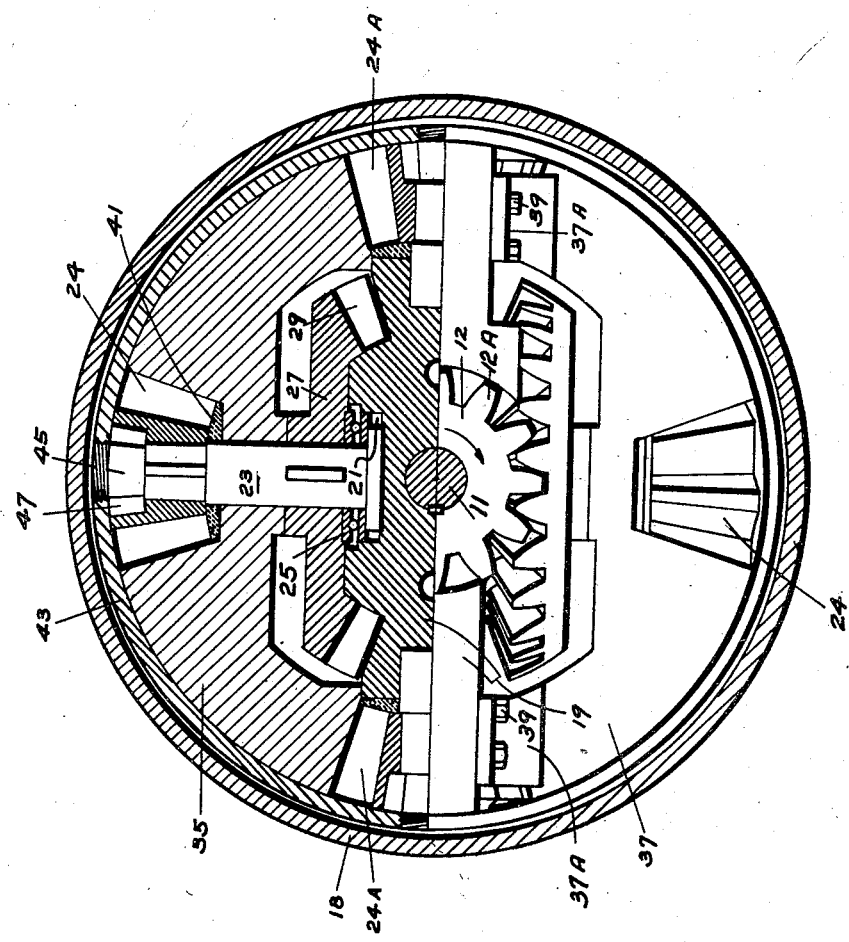

Fig. 4 a sectional end elevation taken on the broken line IV—IV—IV—IV of Fig. 3.

Figure 5:
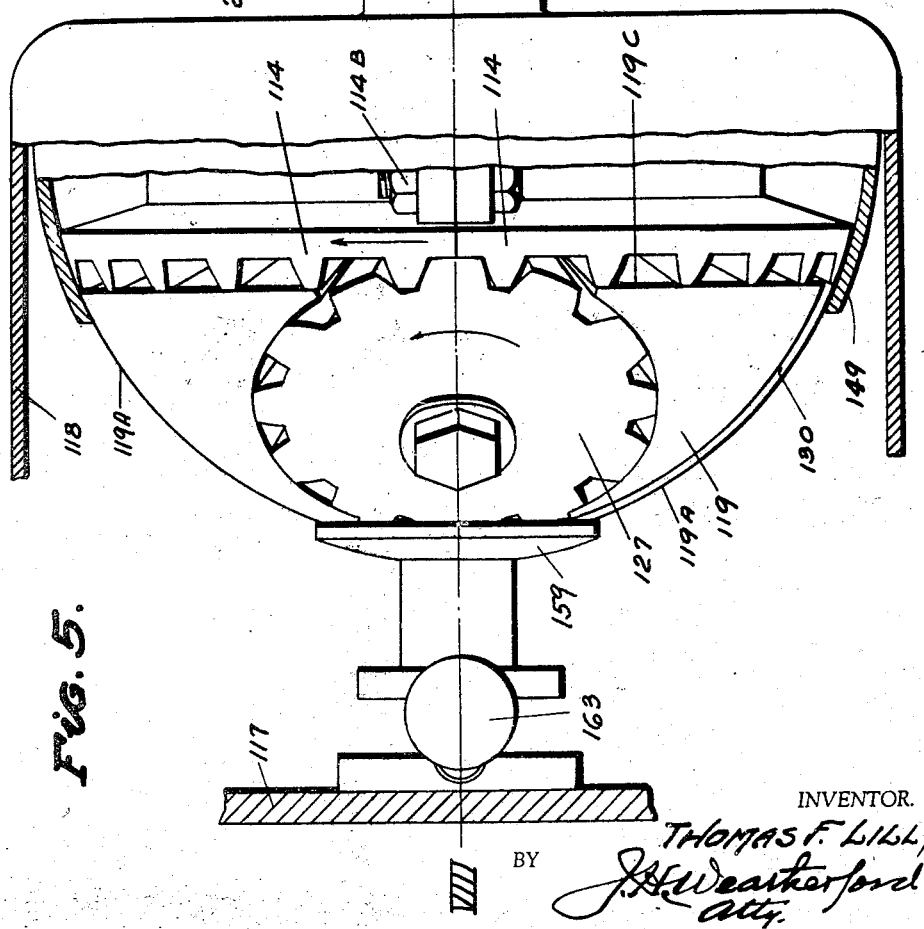

Fig. 5 is a plan of a modified form of the device with portions of enclosing parts broken away and shown in section.

Figure 6:
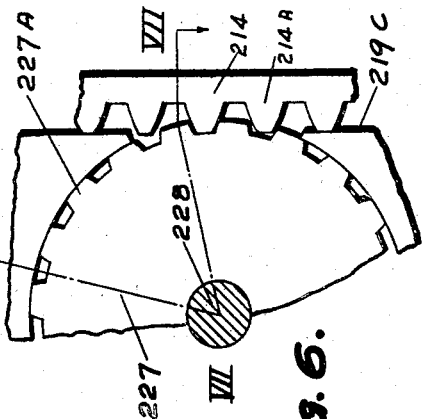

Fig. 6 is a fragmentary plan view showing a modified type of gear tooth; and

Figure 7:
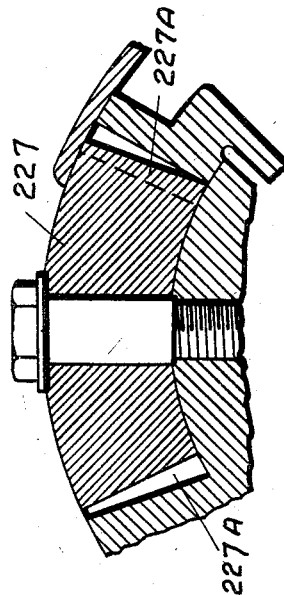

Fig. 7 a complementary, fragmentary sectional elevation taken on the broken line VII—VII—VII of Fig. 6.

Figure 9:
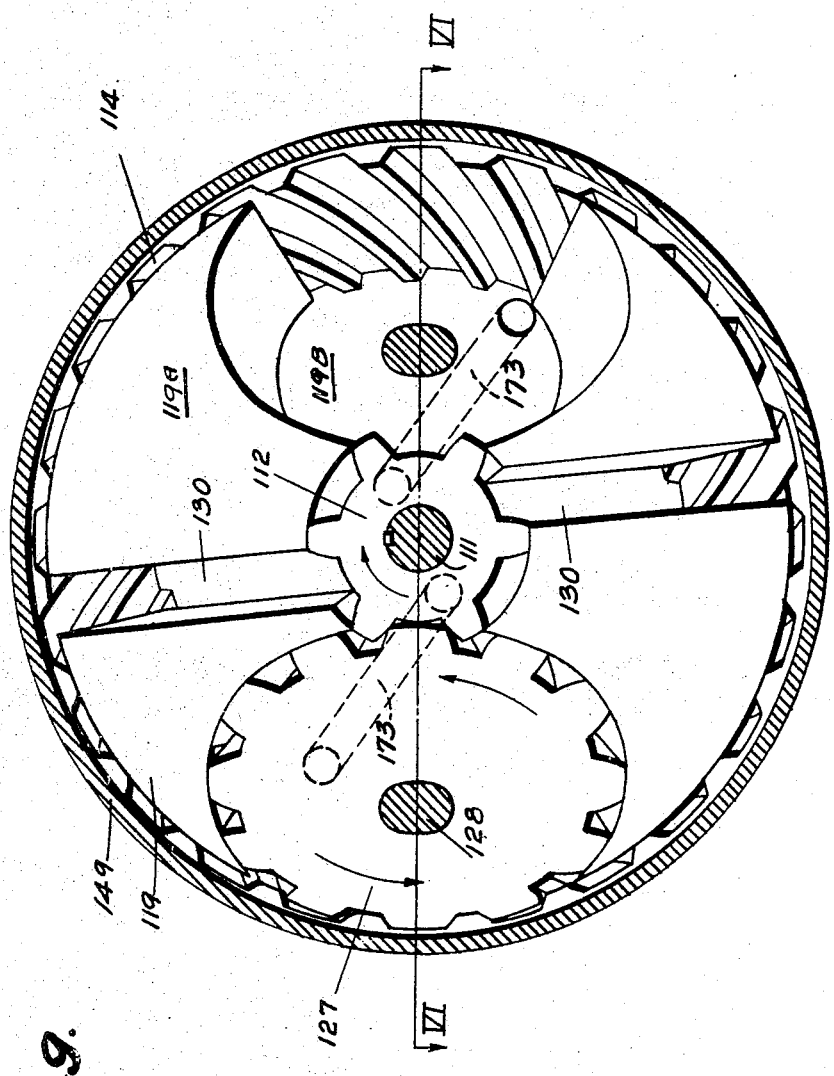

Fig. 8 is a sectional elevation taken on the longitudinal center line of the shafts, and the line VIII—VIII of Fig. 5; and Fig. 9 an elevation with parts cut away along the line IX—IX—IX of Fig. 8, arcuately curved along the outer surface of the gears.

It will be noted that these views are all of a rotatable structure which turns about the longitudinal axis of the shafts and that the terms "plan" and "elevation," except end elevations, are relative only, and correct only as applied to the particular position of the parts as shown in the drawings, and that in the description following where reference is made to plan and elevation it has reference to the parts as they are positioned in the drawings.

Referring now particularly to Figs. 1 to 4:

11 is a driving shaft to which is keyed a driving pinion 12, and 13 a driven shaft in axial alignment with the driving shaft, to which driven shaft a driven gear 14 is secured as through a flange 15 and cap screws 16. 17 is a fragmentary portion of a flywheel mounted on and suitably secured as by a key or otherwise to the driving shaft 11. 18 is a casing, preferably circular in cross section, which is secured to the flywheel, as by bolts or screws.

Figure 1:
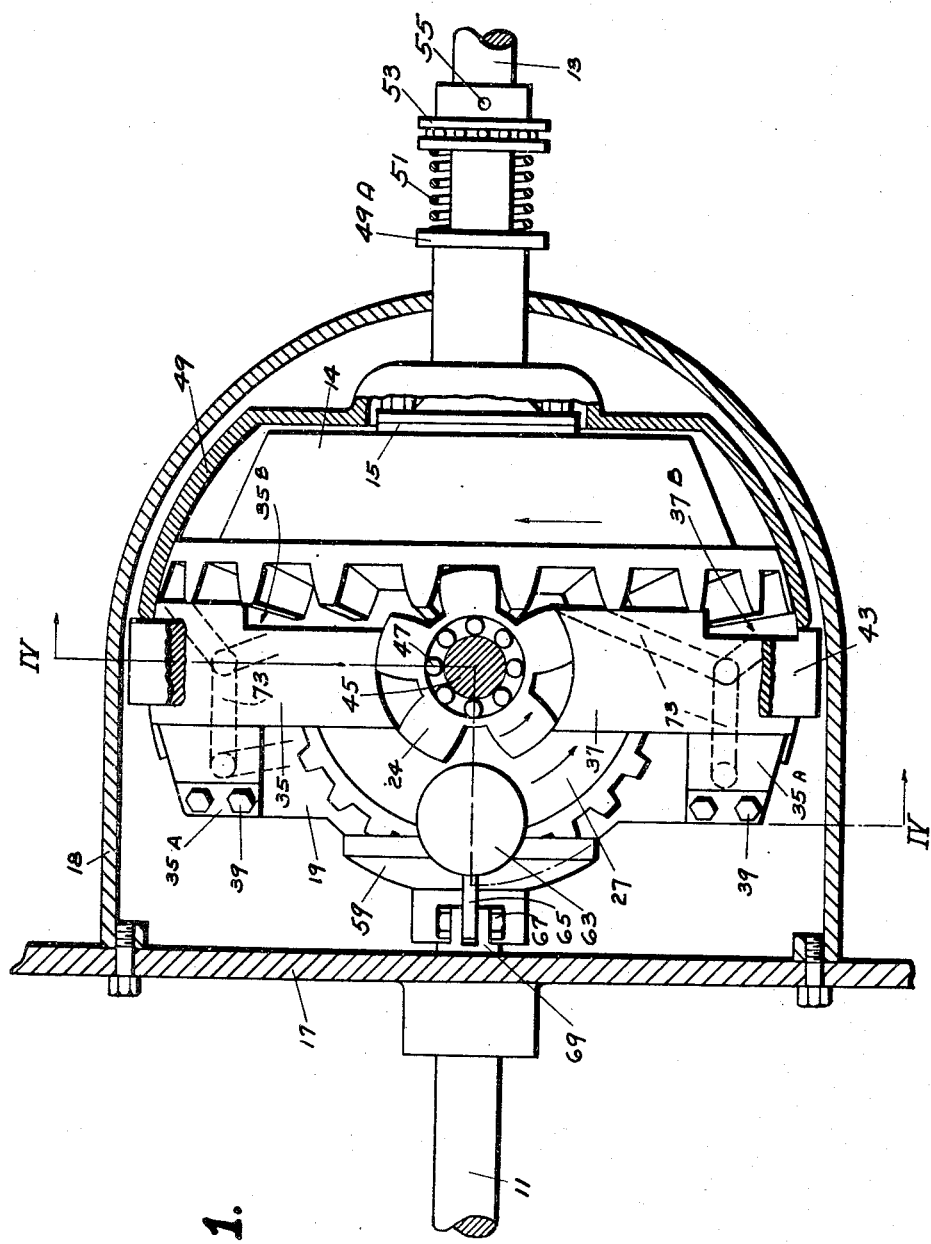
Fig. 1 is a plan with portions of enclosing parts broken away and shown in section.
Figure 2:
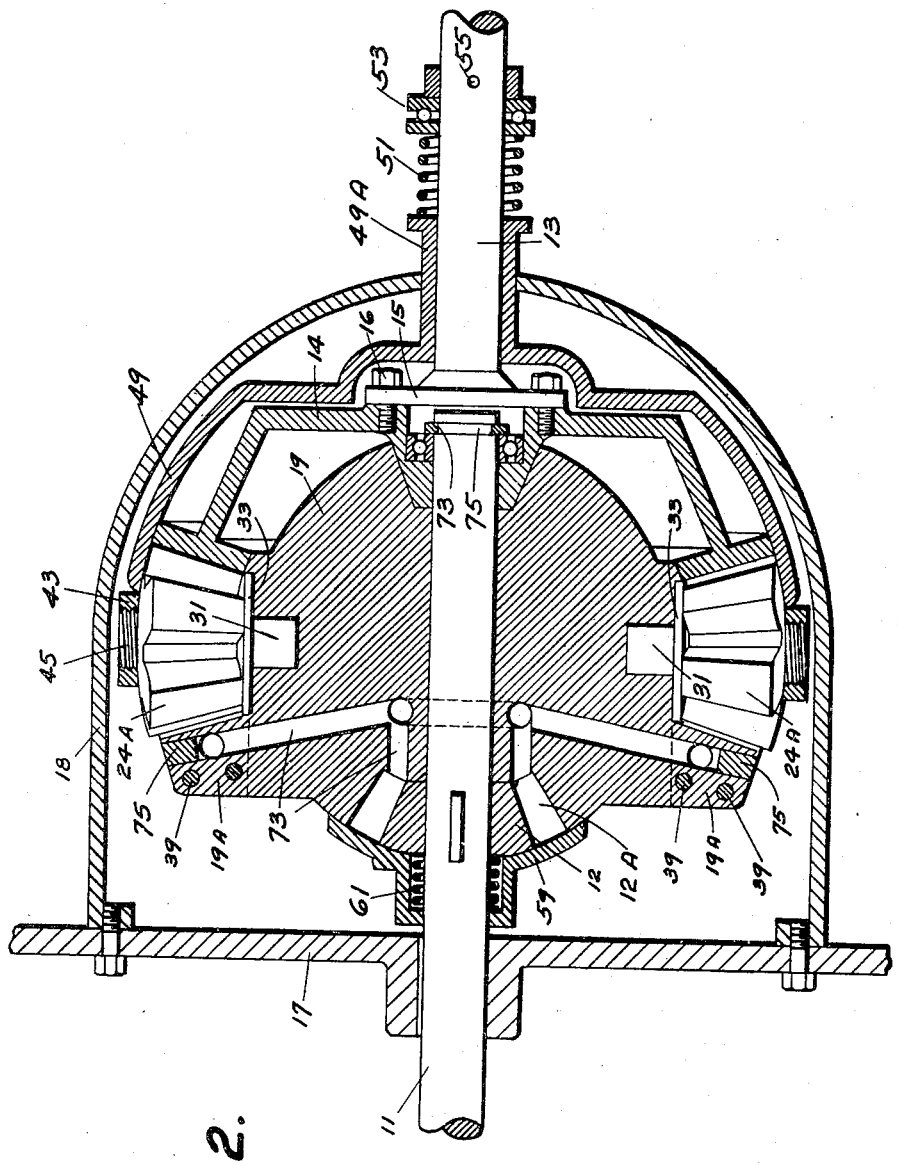
Fig. 2 is a sectional plan taken along the center line of the shafts.

Disposed within the casing is a floating assembly, including a hub 19 which is journalled on the driving shaft 11. This hub is a flattened member which extends laterally from the shaft 11 in opposite directions, as indicated in Figs. 1 and 2, and is relatively of restricted depth, as shown in section, Figs. 3 and 4. Along the shaft the hub extends into abutting relation with the inner end of the driving pinion 12 and its teeth 12—A, and is conically bored, Fig. 2, to closely embrace the tops of the teeth through the limited lateral arcs, Fig. 4, which its thickness allows. Oppositely the hub member extends into abutting relation with the end of the hub of the driven gear 14, and may be conically bored to receive the hub, or cut off along the abutting line as desired.

On its upper and lower faces, as shown in Figs. 3 and 4, the hub 19 is counterbored to form oppositely alined sockets 21 to receive the headed ends of stub shafts 23, and race members of ball bearings 25 for these shafts. In these figures the shafts 23 are shown as respectively extending vertically upward and downward from these sockets. 24 are pinions which are keyed or otherwise respectively secured to the outer ends of these shafts and which mesh with the driven gear 14.

Keyed to the inner ends of the shafts 23 are facing bevel gears 27 which mesh with opposite sides of the driving pinion 12, the inner ends of the teeth 29 of these gears, and preferably the balance of the inner surfaces of the gears, closely, but slidingly embracing opposite surfaces of the floating hub 19, Figs. 3 and 4. The hub is thinned to clear the teeth 29 and extends laterally conformingly outwardly along the tops of the teeth. The laterally outer edges of the hub, at ninety degrees from the shafts 23, are counter-bored to receive stub posts 31 on which are journalled additional, but floating, pinions 24—A conforming to the pinions 24 and likewise meshing with the driven gear 14. The inner ends of these latter pinions and their teeth, closely abut the hub, either directly or as shown through interposed washers 33.

Oppositely from the gear 14, the hub 19 has further extensions 19—A, Fig. 2, which are flattened on opposite sides to form seats for arcuate blocks 35 and 37, which cooperate with the hub to form a floating hub unit. The arcuate blocks respectively have laterally extending portions 35—A, 37—A which over and underlie the extensions and are secured thereto as by bolts or cap screws 39. The blocks 35 and 37 are conically bored to form sockets for the pinions 24 and 24—A, the socket for one pinion 24 being formed in the block 35 and for the other in the block 37 and the sides of the sockets for the pinions 24—A being each formed half in the block 35 and half in the block 37. The peripheral outer surface of the blocks and the interposed hub member is a belt-like section of a sphere, the width of the section conforming to the root diameter of the larger ends of the pinions, and the belt thinning radially inward to conform to the cone of root diameters of the pinions and away from the pinions to lie in sliding contact with the tops of the teeth of the driven gear 14, which meshes with the pinions, except that beyond each pinion socket in the direction of movement of the teeth of the gear 14 away from the sockets the belt is locally cut away to provide spaces 35—B, 37—B for intercommunicating flow of fluid.

Concentrically with the conical sockets for the pinions 24, the blocks 35 and 37 are bored to journal the shafts 23. The bottoms of the sockets are shaped to confiningly conform to the inner ends of the pinions 24, either directly, or, as shown, through interposed washers 41, and along the line of the bottom of the sockets the blocks are broadened to provide a ring-like ledge 35—C, 37—C, Fig. 3, underlying the rim of the gear 14. Externally the blocks are surrounded by a ring 43, which is apertured and internally threaded concentrically with the pinions 24 and 24—A to receive plugs 45 which journal the pinions. The plugs preferably are conical and cooperate with rollers 47 to effect roller bearings, though plain bearings may be used. The outer ends of the plugs 45 are externally threaded to secure them in the threaded openings in the rings.

When assembled the outer surfaces of the blocks 35 and 37, of the pinions 24 and 24—A, socketed therein, and of the driven gear 14 are conforming surfaces of a sphere. 49 is an oil confining cup having an internal spherical surface conforming to the outer spherical surfaces of the blocks, pinions and driven gear, this confining cup being urged into seating contact, as by a compression spring 51, encircling the driven shaft 13. The spring 51 is confined by a thrust collar 53, preferably of ball bearing type, which is secured on the driving shaft 13, as by a pin 55. Additional holes, as the hole 57, Fig. 3, in the shaft 13 may be provided so that the pin 55 may be shifted to vary the tension of the spring 51. The hub of the confining cup preferably has an encircling collar 49—A engageable by manually operable mechanism, not shown, of usual clutch operating type through which manual retraction of the cup may be accomplished.

The outer peripheral surfaces of the bevel gears 27 and the driving pinion 12 are likewise conforming spherical surfaces, and 59 is a cup member having a complementary internal spherical surface adapted to seat against the peripheral surfaces of the gears 27 and the end of the driven pinion 12 to cut off outward escape of fluid from the intermeshing teeth of the pinion and gears.

61 is a compression spring interposed between the hub of the cup member 59 and the pinion 12, urging the cup away from such confining contact. 63 are weights carried by arms 65 which are supported for swinging movement responsive to centrifugal force, as by pins 67, carried by brackets 69 suitably secured to the fly wheel 17, the arms 65 having lug portions 71 adapted to engage complementary surfaces on the cup 59 and under centrifugal action forcing the cup into confining contact with the gears and pinion.

Internally the hub 19 is provided with intercommunicating passageways 73 which lead from the inner ends of the teeth of the pinion 12, Figs. 2 and 3, and through the blocks 35 and 37, and discharge through the approach faces of these blocks, as shown by the dotted passageways in Fig. 1, in immediate proximity to the pinions 24 and 24—A.

The passageway in the hub and blocks may be formed by drilling inward from accessible portions of the blocks and subsequently closing the outer ends of these passageways as by suitable plugs 75.

The driving and driven shafts 11 and 13 are coupled against longitudinal separation, preferably by a ring 73 of well known split type, which is disposed in a groove 75 adjacent the end of the driving shaft 11 and bears against the hub of the driven gear 14, and a similar coupling assembly 173, 175 may be used in the form of the device shown in Fig. 8, and later described.

In Figs. 5, 8 and 9, parts corresponding to or functioning in like manner as those heretofore described have been given the same numbers with the number "1" prefixed, and in Figs. 6 and 7, numbers with the prefix "2."

In these views, 111 is the driving shaft to which is keyed the driving pinion 112, and 113 is the driven shaft to which the driven gear 114 is secured, as through the flange 115 and cap screws 116. For purposes of assembling, the rim of the gear may be made in halves secured together and to a web 114—A, as by bolts 114—B, and cap screws 114—C respectively. 117 is the flywheel, mounted on and suitably secured by a key, or otherwise, to the driving shaft 111. 118 is the casing which is secured to the flywheel, as by bolts or screws.

Disposed within the casing is the floating member or hub 119 which is journalled on the driving shaft 111. This hub is slightly less or slightly greater than one-half of a sphere (being here shown as slightly less), in order that seating contact of the confining cup 149 may be readily effected. The hub is conically counter-bored concentric with the shaft 111 to house the driving pinion 112. The hub is also radially counterbored at one, or a plurality of equally spaced intervals, around the hub to receive one or more intermediate gears 127 which mesh with the pinion 112 and the driven gear 114, there preferably being at least two of these gears on diametrically opposite sides of the pinion 112, these gears replacing the gear and pinion couples 27—24 of that form of the device heretofore described.

The tooth length, and thickness of the pinion 112, and gears 127 are identical, and their outer surfaces and inner ends spherical, as are also the tooth length and internal and outer surfaces of the driven gear 114, the outer surfaces of the pinion 112, and of the gears 127 and 114 conforming to the spherical outer surface 119—A of the hub and their inner surfaces to a secondary inwardly stepped spherical hub surface 119—B. The sockets formed in the hub for the pinion 112 and the gears 127 intersect in order that intermeshing of the pinion and gears may occur. The gears 127 may be journalled on stud bolts 128 which are carried by the hub 119. The hub 119 is cut away to conformingly receive the teeth and rim of the driven gear 114 and permit its intermeshing with the intermediate gears 127. The cut so made lies along a conical surface 119—C, Fig. 5, which intersects the sockets for the gears 127 along the surface cone of the tops of the teeth of the gear 114 and is tangential to the root cone of the gears 127, this cut away portion extending inward to the secondary spherical surface 119—B of the hub. 130 are channelways or grooves in the hub which allows fluid access to the tooth spaces of the gear 114 and of the pinion 112, similar access being had to the outer ends of the tooth spaces of the intermediate gears between the cup member 159 and fluid confining cup 149. The fluid confining cup 149 embraces the peripherally outer surface of the driven gear 114 and the adjacent edges of the gears 127, and the spherical outer surface 119—A of the hub 119 in adjacency to these gears. The cup member 159 embraces the outer end of the driving pinion 112, the adjacent edges of the gears 127 and the spherical outer surface 119—A of the hub 119 in adjacency to these gears.

The confining cup 149 is urged into seating contact with the hub and gears by the compression spring 151, confined between the hub flange 115 of the gear 114 and a ball bearing thrust collar 153 disposed in the annular hub 149—B of the confining cup 149. Tension of the spring 151 may be adjusted by a threaded sleeve 150, Fig. 8.

The cup member 159, as before, is urged away from confining contact with the pinion 112, by a spring 161, and shifted into and held in such contact by weights 163, carried by arms 165 which are supported for swinging movement responsive to centrifugal force, as by pins 167 carried by brackets 169 suitably secured to the flywheel 117. Preferably the weights 163 are urged into releasing position as by springs 172. Similar springs may be used with the weights 63 of Figs. 1 to 4.

Passageways 173 lead from the inner ends of the intermeshing teeth of the pinion 112 and gears 127 through the hub 119 to the bottom of the intermediate gear sockets and the inner ends of the intermeshing teeth of the gears 127 and the gear 114, at substantially the point where meshing begins.

Preferably in either form of the device, in order to increase the amount of fluid brought in by, and increase the pressure area effective in the driven gear tooth spaces relatively to the fluid brought in and to the areas of the intermeshing gear tooth spaces, and thereby secure multiple torque on the driven gear and shaft at speeds of such shaft lower than that of the driving pinion and shaft, the thickness of the teeth of the driven gears 14, or 114, as the case may be, is much less than the tooth spaces therebetween, and correspondingly the tooth thickness of the pinions 24 and 24—A meshing with the gear 14 is correspondingly greater than the tooth space of these same pinions, and the tooth thickness of the gears 127 meshing with the gear 114, is correspondingly much greater than the tooth space of the same gears 127.

These larger spaces between the teeth of the driven gear 14, or 114, relative to the tooth spaces of the intermeshing gears establish in the driven gear responsive areas under pressure which are effective to multiply the torque effect of the driving gears on the driven gear. As shown, the relation is substantially two to one.

In Figs. 6 and 7, to similarly secure multiple torque, a modified form of tooth is shown in which the tops of the teeth 227—A of the intermediate gears 227 are peripherally cut away, preferably in greater degree toward the outer ends of the gear teeth to reduce the tooth space area of such gears relatively to the tooth space area of the driven gear 214, in which the teeth are left of full depth. In this modified construction the conical gear sockets conform, as before, to the peripheral surfaces of the cut away gear teeth 227—A.

In the forms shown in Figs. 5 to 9, the driving pinion 112, meshing with the intermediate gears 127, or 227, must have teeth and tooth spaces corresponding to the teeth and tooth spaces of gear 114, or 214, and this same relation may be carried out between the driving pinion 12 and the gears 27 meshing therewith, shown in Figs. 1 to 4.

Preferably also to assist in confining the fluid and reduce outward centrifugal flow, the teeth of the gear 14, and of the pinions 24 and 24—A meshing therewith, are spiral teeth and the teeth of the gear 114, the intermediate gears 127, and the driving pinion 112 are also spiral teeth, this spiralling being shown in Fig. 9 only. In the forms of the device shown, the direction of rotation of the various gears is indicated on each thereof by an arrow. Where the teeth are spiralled, as preferred, the spirals are so disposed that engagement of the outer ends of the teeth occurs first and tooth engagement progresses inward and away from the confining cups 49, or 149 respectively, this inward progression of engagement away from the confining cups moving the fluid away from the cups and assisting in the confinement of the fluid. Also the spiralling of the gears and the inward forcing of the fluid resists, and to a large extent, counteracts centrifugal throw of the fluid, which is particularly advantageous when speed of rotation of the gears is high, and except in the case of the cut away teeth of Figs. 6 and 7, to which it has no particular applicability, may largely eliminate need for the fluid confining cup 49, or 149.

The transmission is rendered complete for use by filling the casing 18, or 118, with fluid, preferably oil. When rotation of the driving shaft 11, or 111, is begun the cup member 59, or 159, is held away from contact with the driving pinion 12, or 112, and the intermeshing gears 27, or 127, by the spring 61, or 161, until movement of the weights 63, or 163, responsive to centrifugal force, overcomes the tension of the spring and forces the cup member into contact with the driving pinion and gears, confining fluid carried into and trapped in the spaces between the pinion teeth and the gear teeth against outward flow and causing such fluid to be forced from the inner ends of the tooth spaces through the passages 73, or 173. Discharge from these passageways is into the tooth spaces of the driven gear 14, or 114, preferably at the point of meshing engagement of the teeth of the intermeshing pinions 24, 24—A, or the intermediate gears 127, with the teeth of the driven gear 14, or 114. In that form of the device shown in Figs. 1 to 4, meshing action of the teeth of the pinion 12, with the teeth of the gears 27, accomplishes rotative movement of the gear pinion couples 27—24, this rotative movement, through engagement of the pinions 24 with the driven gear 14, causing the floating hub 19 and gear assemblies carried thereby to rotate about the shaft 11, without driving action on the gear 14 unless fluid flow is restricted, but where relative rotation of the pinion 12 and gears 27 is restricted by reducing or blocking escape of fluid from the inner ends of their teeth through the passageways 73, tending to cause rotation of the driven gear. Rotation of the pinions 24 and 24—A relative to the driven gear 14 is resisted by the trapping of the fluid in the meshing teeth and spaces of the pinions and gear by the confining cup 49, and the preferred spiral tooth construction where used. This latter rotative restriction is furthered by the augmenting discharge flow from pinion 12 through the passageways in the hub into the tooth spaces of the gear 14.

When rotation of the driving shaft 11 is begun the cup member 59 is held away from the pinion 12 by the spring 61, allowing fluid to escape freely from the outer ends of the teeth of the pinion 12. Rotation of the shaft and pinion turns the gears 27 and the coupled pinions 24 and rolls these pinions along the face of the gear 14 with the teeth of which the pinions engage, the hub unit carrying the gear couples, rotating on the shaft 11.

In this rolling movement of the pinions 24, 24—A, along the face of the driven gear 14, fluid enters the teeth of the gear 14 through the spaces 35—A, 37—A, and is moved by the gear teeth along the confining surfaces of the blocks 35 and 37, Fig. 1, toward the pinions 24 and 24—A, and is also brought in by the teeth of the pinions 24 toward the gear 14, being confined in such approach by the sides of the pinion or gear sockets. Inward escape of the fluid along the tooth spaces is blocked by the bottoms of the sockets and the ring-like ledge 35—B, 37—B, and outward escape resisted by the resiliently held confining cup 49. Fluid in the tooth spaces of the gear 14 and pinions 24 is trapped by the confining cup 49, but is free to escape through the passageway 73 to the pinion 12 from which the displacement of the cup member 59 allows free escape and this condition continues until speeding up of the driving shaft 11 is sufficient, through centrifugal action on the weights 63 and their outward movement, to seat the cup member against the pinion 12 and prevent escape of fluid therefrom. When this condition arises fluid in the tooth spaces of both the pinion 12 and the pinions 24 is trapped and resistance is set up to the relative rotation of the pinions 12 and the gears 27, and of the pinions 24 and the gear 14.

The torque exerted on the gear 14 is proportional to the relative diameters of the pinion 12 and the gear 14 increased by the ratio of the diameters of the gears 27 to their coupled pinions 24, this relation in the present instance being four to one between the pinions 12 and the gear 14 and two and one-half to one between the gears 27 and the pinions 24, or an over-all advantage in torque relation of some ten to one available when the driving shaft speed is high and the driven shaft is just beginning to turn.

This torque advantage is hydraulically increased by the relatively greater tooth space areas of the gear 14 as related to the tooth space areas of the pinions 24 meshing therewith, permitting the fluid pressure established in these tooth spaces to act on larger pressure surfaces in the gear 14 than the pressure surfaces in the pinions 24 with increased driving effect, and is further increased by the discharge pressures set up by the pinion 12 transferred through the passageways 73 to the driven gear 14 at largely increased radial distances outward from the shaft 12 due to the larger diameter of the gear 14 relatively to the pinion 12.

This multiplied torque is applied through the gear 14 to the shaft 13, the effect being substantially that of a lever, fulcrumed between the pinion 12 and the gear 14 with the fulcrum initially extremely close to the gear 14, and the resulting torque pressures on the gear 14 very great. As the gear 14 responds to these pressures and begins to turn the combined hydraulic-mechanical pressures decrease the effective lever lengths as though the pinion 12 was moved closer to the gear 14, this movement effect continuing until equal speed of the two shafts 11 and 13 obtain, at which time substantially solid coupling between the shafts occurs and the torque becomes equal in the two shafts.

When this action starts, the pressures hydraulically exerted in the tooth spaces of the gear 14 are so excessive that displacement of the confining cup occurs, permitting temporary relief and allowing gradual adjustment and build-up of the speed of the driven shaft toward the driving shaft speed. Obviously the tension of the spring 51 must be adjusted to provide just that balance between escape flow pressure on the confining cup which is necessary to provide smooth equalizing transfer of the pressure set up by the driving end of the gear-pinion couple on the driven gear 14 and accomplish automatically the proper relation between speeds of the shaft 11 and the shaft 13, which will utilize the power exerted by the shaft 11 on the shaft 13, and which will utilize the power exerted by the shaft 11 most effectively.

The same effects are secured in that form of the device shown in Figs. 5, 8 and 9, with the exception that the step up gear-pinion couple is eliminated and the mechanical ratio established become those of the diameter of the pinion 112 to the gear 114 without multiplication by interposed gear couples, it being obvious that the size of the intermediate gears 127 otherwise than as they are necessary to mechanically span between the pinion 112 and the larger gear 114 because of the larger size of that gear, relatively to the pinion 112, have no bearing on the result.

At low or idling speeds of the driving shaft, all driving action is eliminated as though the clutch ordinarily used had been depressed, and with the driven shaft at speed, overrunning, or in a vehicle, free wheeling occurs unless otherwise prevented.

It will be understood that the results obtained may be accomplished by a single gear couple 27—24 interposed between the pinion 12 and the gear 14, or by a single gear 127 interposed between the pinion 112 and the gear 114, but that to provide smoother action it is greatly preferred that at least two gear couples, or two gears, as the case may be, be interposed, or even that additional gear couples, or gears, be used, and that where two gear couples, or gears, are used they be placed diametrically opposite, or if more be used, that they be spaced at equal intervals, and it will be understood that in construing the claims this be kept in mind.

It will further be understood that the tooth shapes here shown, as of typical driving gear contour, may be changed to typical gear pump teeth contours which accomplish closer fitting and more complete expulsion of fluid from the tooth spaces, should it be so desired.

I claim:

1. In a transmission mechanism which includes driving and driven gears having intermeshing teeth, and fluid filling the tooth spaces of said gears, means adapted to substantially prevent escape of said fluid from the inner ends of the tooth spaces, and means adapted to urge confinement of said fluid against escape from the outer ends of the tooth spaces of said intermeshing teeth, which includes spiralling the teeth of said gears from their inner ends outward in the direction of rotation of said gears to cause initial engagement of the outer ends of said teeth and progressive inward engagement.

2. In a mechanism of the character described, a driving shaft, a driven shaft, including a driving pinion secured on said driving shaft, a driven gear secured on said driven shaft, intermediate gearing meshing with said pinion and said gear, and a floating hub unit journalled on one of said shafts socketing and bottoming said pinion, socketing, bottoming and journalling said intermediate gearing, and contacting the faces and bottoming the inner ends of the teeth of said driven gear; means for establishing a fluid supply in the tooth spaces of said pinion and gears, and means for limiting exit flow of said fluid from the tooth spaces of meshing teeth of said gearing, including a cup member overlying the outer end of the meshing teeth of said pinion and gearing and adjacent hub portions, and shiftable relatively thereto, for controlling exit of fluid therefrom, and means carried by said driving shaft and responsive to centrifugal force adapted to shift said cup into controlling contact with said pinion and gearing.

3. In a mechanism of the character described, a driving shaft, a driven shaft, a driving pinion secured on said driving shaft, a driven gear secured on said driven shaft, intermediate gearing meshing with said pinion and said gear, and a floating hub unit journalled on one of said shafts, socketing and bottoming said pinion, socketing, bottoming and journalling said intermediate gearing and contacting the faces and inner ends of the teeth of said driven gear, means for establishing a fluid supply in the tooth spaces of said pinion and gears, and means for resisting exit flow of said fluid from the tooth spaces of meshing teeth of said driven gear and intermediate gearing, including a confining cup overlying the outer ends of said tooth spaces and in fluid confining contact with adjacent portions of said gears, said cup being shiftable away from said confining contact under exit pressure of said fluid, and resilient means urging said cup into sealing contact.

4. In a mechanism of the character described, a driving shaft and a driven shaft in axial alinement; a driving pinion secured on said driving shaft, a driven gear secured on said driven shaft, a floating assembly interposed between said pinion and said driven gear, socketing and bottoming said pinions and contacting the faces and inner ends of the teeth of said driven gears, said assembly including a hub unit journalled on one of said shafts, intermediate gearing socketed in and journalled by said hub unit, meshing with said pinion and said driven gear, means for establishing a fluid supply in the tooth spaces of said pinion and gears and effecting driving connection therebetween; means cooperating with said hub unit, and respectively with meshing teeth of said pinion and intermediate gearing, and of said intermediate gearing and driven gear to resist escape of said fluid from the tooth spaces of said meshing teeth.

5. In a mechanism of the character described, a driving shaft and a driven shaft in axial alinement; a driving pinion secured on said driving shaft, a driven gear secured on said driven shaft, a floating assembly interposed between said pinion and said driven gear, said assembly including a hub unit journalled on one of said shafts, socketing and bottoming said pinion, and contacting the faces and inner ends of the teeth of said driven gear, intermediate gearing socketed, bottomed in, and journalled by, said hub unit, meshing with said pinion and said driven gear, and effecting driving connection therebetween; means for establishing a fluid supply in the tooth spaces of said pinion and gears, passageways through said hub unit establishing communication between the tooth spaces of meshing teeth of said pinion and intermediate gearing and the tooth spaces of meshing teeth of said intermediate gearing and said driven gear, means substantially confining exit flow of fluid from said pinion-intermediate gearing tooth spaces to said passageways, and means resisting exit flow of fluid from said intermediate gearing-driven gear tooth spaces.

6. In a mechanism of the character described, a driving shaft and a driven shaft in axial alinement; a driving pinion secured on said driving shaft, a driven gear secured on said driven shaft, a floating assembly interposed between said pinion and said driven gear, said assembly including a hub journalled on one of said shafts, socketing and bottoming said pinion, and contacting the faces and inner ends of the teeth of said driven gear, intermediate gears socketed, bottomed in, and journalled by said hub, meshing with said pinion and said driven gear, and effecting driving connection therebetween; means for establishing a fluid supply in the tooth spaces of said pinion and gears; and means, cooperating with said hub, and respectively resisting escape of fluid from tooth spaces of meshing teeth of said pinion and intermediate gears, and of said intermediate gears and driven gear.

7. In a mechanism of the character described, a driving shaft and a driven shaft in axial alinement; a driving pinion secured on said driving shaft, a driven gear secured on said driven shaft, a floating assembly interposed between said pinion and said driven gear, said assembly including a hub journalled on one of said shafts, socketing and bottoming said driving pinion, and contacting the faces and inner ends of the teeth of said driven gear, intermediate gears socketed and journalled by said hub, meshing with said pinion and said driven gear, and effecting driving connection therebetween; means for establishing a fluid supply in the tooth spaces of said pinion and gears, passageways through said hub establishing communication between the tooth spaces of meshing teeth of said pinion and intermediate gears and the tooth spaces of meshing teeth of said gears, and said driven gear, means substantially confining exit flow of fluid from said pinion-intermediate gear tooth spaces to said passageways and means resisting exit flow of fluid from said intermediate gear-driven gear tooth spaces.

8. In a mechanism of the character described, a driving shaft and a driven shaft in axial alinement; a driving pinion secured on said driving shaft, a driven gear secured on said driven shaft, a floating assembly interposed between said pinion and said driven gear, said assembly including a hub unit journalled on one of said shafts, gearing units, each including a gear and pinion coupled for unitary turning movement, respectively meshing with said pinion and said driven gear, journalled by said hub unit, and effecting driving connection therebetween; means for establishing a fluid supply in the tooth spaces of said pinion and gears, and means, including said hub unit, respectively resisting escape of fluid from tooth spaces of meshing teeth of said driving pinion and said unit-gears, and of said unit-pinions and said driven gear.

9. In a mechanism of the character described, a driving shaft and a driven shaft in axial alinement; a driving pinion secured on said driving shaft, a driven gear secured on said driven shaft, a floating assembly interposed between said pinion and said driven gear, said assembly including a hub unit journalled on one of said shafts; gearing units, each including a gear and pinion coupled for unitary turning movement, respectively meshing with said pinion and said driven gear, journalled by said hub unit and effecting driving connection therebetween; means for establishing a fluid supply in the tooth spaces of said pinion and gears, passageways through said hub unit establishing communication between the tooth spaces of meshing teeth of said driving pinion and said gear and pinion units, and the tooth spaces of meshing teeth of said units and said driven gear, means, including said hub unit, substantially confining exit flow of fluid from said pinion and gear-pinion-unit tooth spaces to said passageways, and means, cooperating with said hub unit, resisting exit flow of fluid from said gear-pinion and driven gear tooth spaces.

10. In a mechanism of the character described, a driving member and a driven member; a driving pinion secured to said driving member, a driven gear secured to said driven member, and a floating assembly including a hub journalled by one of said members, socketing and bottoming said pinion and in confining contact with the face and inner ends of the teeth of said driven gear, intermediate gears socketed, bottomed and journalled in said hub, and meshing with said pinion and said driven gears; means for establishing a fluid supply in the tooth spaces of said pinion and gears, fluid-confining means where said pinion and intermediate gears, and said intermediate gears and driven gear respectively mesh, comprising a cup member and a confining cup, said cup member overlying the outer end of the meshing teeth of said pinion and gears, and adjacent hub portions, and being shiftable axially with respect thereto, and means carried by said driving member and responsive to centrifugal force adapted to shift said cup into confining contact with said hub, at and above a predetermined rotational speed of said member; said confining cup contacting the rim and outer ends of the teeth of said driven gear and meshing teeth of said intermediate gears and adjacent portions of said hub unit and being shiftable axially away from said contact under exit pressure of fluid from the tooth spaces of said gear, and resilient means urging said confining cup into seating contact; and passageways extending through said hub from the bottomed ends of the said meshing teeth of said pinion and gears to the tooth spaces of the meshing teeth of said gears and said driven gear.

11. In a mechanism of the character described, a driving shaft and alined driven shaft; a driving pinion secured on said driving shaft, a driven gear secured on said driven shaft, and a floating assembly interposed between said pinion and said driven gear; said assembly including a hub unit journalled on one of said shafts, socketing and bottoming said pinion and in housing contact with the face and inner ends of the teeth of said driven gear, intermediate gearing socketed, bottomed, and journalled in said hub unit, and meshing with said pinion and said driven gear; means for establishing a fluid supply in the tooth spaces of said pinion and gears, fluid-confining means including a cup member and a confining cup, said cup member overlying the outer end of the meshing teeth of said pinion and gearing, and adjacent hub unit portions, and being shiftable along said driving shaft, resilient means urging said cup member away from confining contact with said hub and teeth, and means carried by said driving shaft and responsive to centrifugal force adapted to overcome said resilient means at and above a predetermined rotational speed of said shaft; said confining cup contacting the rim and outer ends of the teeth of said driven gear and meshing teeth of said intermediate gearing and adjacent portions of said hub unit and being shiftable along said driven shaft away from said contact under exit pressure of fluid from the tooth spaces of said gear, and resilient means urging said confining cup into seating contact.

12. In a mechanism of the character described, a driving shaft and a driven shaft; a driving pinion secured on said driving shaft, a driven gear secured on said driven shaft, and a floating assembly interposed between said pinion and said driven gear; said assembly including a hub unit journalled on one of said shafts, socketing and bottoming said pinion and in housing contact with the face and inner ends of the teeth of said driven gear, intermediate gearing socketed, bottomed, and journalled in said hub unit, and meshing with said pinion and said driven gear; means for establishing a fluid supply in the tooth spaces of said pinion and gears, fluid-confining means including a cup member and a confining cup, said cup member overlying the outer end of the meshing teeth of said pinion and gearing, and adjacent hub unit portions, and being shiftable along said driving shaft, resilient means urging said cup member away from confining contact with said hub and teeth, and means carried by said driving shaft and responsive to centrifugal force adapted to overcome said resilient means at and above a predetermined rotational speed of said shaft; said confining cup contacting the rim and outer ends of the teeth of said driven gear and meshing teeth of said intermediate gearing and adjacent portions of said hub unit and being shiftable along said driven shaft away from said contact under exit pressure of fluid from the tooth spaces of said gear, and resilient means urging said confining cup into sealing contact; and passageways extending through said hub unit, from the bottomed ends of the meshing teeth of said pinion and intermediate gearing to the tooth spaces of the meshing teeth of said intermediate gearing and said driven gear, at substantially the point of meshing contact.

13. In a mechanism of the character described, a driving shaft and a driven shaft in axial alinement; a driving pinion secured on said driving shaft, a driven gear secured on said driven shaft and a floating assembly interposed between said pinion and said driven gear, said assembly including a hub journalled on one of said shafts, an intermediate gear, carried and journalled by said hub, meshing with said pinion and said driven gear, and effecting driving connection therebetween; means for establishing a fluid supply in the tooth spaces of said pinion and gears, fluid-confining means where said pinion and intermediate gear, and said intermediate gear and driven gear respectively mesh, including a cup member overlying the outer ends of said pinion and meshing portions of said intermediate gear, resilient means urging said cup member away from confining contact with said pinion, said hub and said intermediate gear, means carried by said pinion shaft and responsive to centrifugal force adapted to overcome said resilient means at and above a predetermined rotative speed of said shaft; and a shiftable confining cup overlying the rim and tooth ends of said driven gear, and meshing portions of said intermediate gear, and resilient means urging said confining cup into seating contact with said driven and intermediate gears.

14. In a mechanism of the character described, a driving shaft and a driven shaft in axial alinement; a driving pinion secured on said driving shaft, a driven gear secured on said driven shaft and a floating assembly interposed between said pinion and said driven gear, said assembly including a hub journalled on one of said shafts, an intermediate gear, carried and journalled by said hub, meshing with said pinion and said driven gear, and effecting driving connection therebetween; means for establishing a fluid supply in the tooth spaces of said pinion and gears, fluid-confining means where said pinion and intermediate gear, and said intermediate gear and driven gear respectively mesh, including a cup member overlying the outer ends of said pinion and meshing portions of said intermediate gear, resilient means urging said cup member away from confining contact with said pinion, said hub and said intermediate gear, means carried by said pinion shaft and responsive to centrifugal force adapted to overcome said resilient means at and above a predetermined rotative speed of said shaft; and a shiftable confining cup overlying the rim and tooth ends of said driven gear, and meshing portions of said intermediate gear, and resilient means urging said confining cup into seating contact with said driven and intermediate gears, and a passageway leading through said hub from the inner end of the meshing teeth of said pinion and intermediate gear, to the meshing teeth of said intermediate gear and driven gear at substantially the point of meshing contact.

15. In a mechanism of the character described, a driving shaft and a driven shaft in axial alinement; a driving pinion secured on said driving shaft, a driven gear secured on said driven shaft, and a floating assembly interposed between said pinion and said driven gear; said assembly including a hub unit journalled on one of said shafts, a gear and integrally coupled pinion carried and journalled by said hub unit, meshing respectively with said pinion and said gear, and effecting a speed reducing driving connection therebetween; means for establishing a fluid supply in the tooth spaces of said pinion and gears, fluid-confining means where said pinion and couple-gear, and said couple-pinion and driven gear respectively mesh, including a cup member overlying the outer ends of said pinion and meshing portions of said couple-gear, resilient means urging said cup member away from confining contact with said pinion, said hub unit and said gear, means carried by said shaft and responsive to centrifugal force adapted to overcome said resilient means at and above a predetermined rotative speed of said shaft; and a shiftable confining cup overlying the rim and tooth ends of said driven gear, and meshing portions of said couple-pinion, and resilient means urging said confining cup into seating contact with said gear, and pinion.

16. In a mechanism of the character described, a driving shaft and a driven shaft in axial alinement; a driving pinion secured on said driving shaft, a driven gear secured on said driven shaft and a floating assembly interposed between said pinion and said driven gear; said assembly including a hub unit journalled on one of said shafts, a gear and integrally coupled pinion carried and journalled by said hub unit, meshing respectively with said pinion and said gear, and effecting a speed reducing driving connection therebetween; means for establishing a fluid supply in the tooth spaces of said pinion and gears, fluid-confining means where said pinion and couple-gear, and said couple-pinion and driven gear respectively mesh, including a cup member overlying the outer ends of said pinion and meshing portions of said couple-gear, resilient means urging said cup member away from confining contact with said pinion, said hub unit and said gear, means carried by said shaft and responsive to centrifugal force adapted to overcome said resilient means at and above a predetermined rotative speed of said shaft; and a shiftable confining cup overlying the rim and tooth ends of said driven gear, and meshing portions of said couple-pinion, and resilient means urging said confining cup into seating contact with said gear, and pinion, and a passageway leading through said hub from the inner end of the meshing teeth of said driving pinion and couple-gear to the meshing teeth of said couple-pinion and driven gear, at substantially the point of meshing contact.

17. In a mechanism of the character described, driving means including a pinion, driven means including a driven gear, a hub interposed between said pinion and said gear and journalled by one of said means, an intermediate gear carried and journalled by said hub and meshing with said pinion and said driven gear, means for establishing a fluid supply in the tooth spaces of said pinion and gears, said hub having intersecting sockets formed therein to respectively receive said pinion and said intermediate gear and being annularly cut away to receive the teeth and rim of said driven gear and permit engagement thereof with said intermediate gear, the bottom of said sockets conformingly embracing the inner ends of said pinion and said intermediate gear and the bottom of said annular groove conformingly underlying said teeth and rim, the outer face of said hub, said pinion, and said gears forming a spherical surface, a cup member embracingly overlying the end of said pinion and adjacent portions of said hub and said intermediate gear, and a confining cup embracingly overlying the outer ends of the teeth and rim of said driven gear and adjacent portion of the surface of said hub and said intermediate gear, resilient means urging said cup member away from confining contact with said pinion and intermediate gear, means carried by said driving means and responsive to centrifugal force set up by rotation of said means for overcoming said resilient means and seating said cup member in said confining contact, and resilient means urging said confining cup into seating contact with said intermediate and driven gears and said hub member.

18. In a mechanism of the character described, driving means including a pinion, driven means including a driven gear, a hub interposed between said pinion and said driven gear and journalled by one of said means, intermediate gears carried and journalled by said hub, and meshing with said pinion and said driven gear, means for establishing a fluid supply in the tooth spaces of said pinion and gears, said hub having intersecting sockets formed therein to respectively receive said pinion and intermediate gears and being annularly cut away to receive the teeth and rim of said driven gear and permit engagement thereof with said intermediate gears, the bottom of said sockets conformingly embracing the inner ends of said pinion and said intermediate gears and the bottom of said annular groove conformingly underlying the teeth and rim of said driven gear, the outer face of said hub, said pinion, and said gears forming a spherical surface, a cup member embracingly overlying the end of said pinion and adjacent portions of said hub and intermediate gears, and a confining cup embracingly overlying the outer ends of the teeth and rim of said driven gear and the adjacent surface of said hub and said intermediate gears, resilient means urging said cup member away from confining contact with said pinion and intermediate gears, means carried by said driving means and responsive to centrifugal force set up by rotation of said means for overcoming said resilient means and seating said cup member in said confining contact, and resilient means urging said confining cup into seating contact with said intermediate and driven gears and said hub member.

19. In a mechanism of the character described, driving means including a pinion, driven means including a driven gear, a hub interposed between said pinion and said driven gear and journalled by one of said means, intermediate gears carried and journalled by said hub, and meshing with said pinion and said driven gear, means for establishing a fluid supply in the tooth spaces of said pinion and gears, said hub having intersecting sockets formed therein to respectively receive said pinion and intermediate gears and being annularly cut away to receive the teeth and rim of said driven gear and permit engagement thereof with said intermediate gears, the bottom of said sockets conformingly embracing the inner ends of said pinion and said intermediate gears and the bottom of said annular groove conformingly underlying the teeth and rim of said driven gear, the outer face of said hub, said pinion, and said gears forming a spherical surface, a cup member embracingly overlying the end of said pinion and adjacent portions of said hub and intermediate gears, and a confining cup embracingly overlying the outer ends of the teeth and rim of said driven gear and the adjacent surface of said hub and said intermediate gears, resilient means urging said cup member away from confining contact with said pinion and intermediate gears, means carried by said driving means and responsive to centrifugal force set up by rotation of said means for overcoming said resilient means and seating said cup member in said confining contact, resilient means urging said confining cup into seating contact with said intermediate and driven gears and said hub member, and passageways through said hub from the inner ends of the teeth and tooth spaces of said pinion to the inner ends of meshing teeth and spaces of said intermediate and driven gears.

20. In a transmission mechanism, which includes a driving pinion, a driven gear spaced therefrom, intermediate gearing meshing with both thereof, means for supplying fluid to the tooth spaces of said gearing, means for housing meshing portions of said pinion and gearing and of said gearing and driven gear, and means resisting exit flow from said meshing portions, independent means establishing a bypass passageway from tooth spaces of meshing teeth of said pinion and gearing to tooth spaces of meshing teeth of said gearing and driven gear at substantially the point of entrance into mesh.

21. A transmission mechanism which includes a driving pinion, a driven gear of substantially greater diameter than said pinion, and intermediate gearing meshing respectively with said pinion and said gear, and respectively forming therewith gear-pump elements, means establishing a fluid supply in the tooth spaces of said pump elements, means housing said pump elements and restricting flow therefrom, and means establishing intercommunicating passageways between the said respective pump elements.

22. A transmission mechanism which includes a driving pinion, a driven gear of substantially greater diameter than said pinion, a floating hub journalled between said pinion and gear, and intermediate gearing, carried and journalled by said hub, meshing respectively with said pinion and said gear and forming therewith gear-pump elements, means establishing a fluid supply in the tooth spaces of said pump elements, means, including said hub, housing portions of said pump elements and restricting flow therefrom, and passageways through said hub interconnecting the said pump elements.

23. A transmission mechanism, which includes meshing bevel gears having both the inner and the outer ends of their teeth and adjacent rim portions spherically concentric about the intersection of the axes of said gears as a center, and means, conformingly spherical, cooperating respectively with both said tooth ends and adjacent rim portions of the meshing teeth of said gears, to effect end closure of the tooth spaces thereof.

24. A transmission mechanism, which includes driving and driven gears having intermeshing teeth, fluid filling the tooth spaces of said gears, and means adapted to urge confinement of said fluid filling the tooth spaces of meshing portions of said gears, in which mechanism, peripheral portions of the teeth of the driving gears are cut away to greatly reduce the area of the tooth spaces of the driving gears relatively to the tooth spaces of the driven gear, whereby to establish in the driven gear pressure responsive areas, relatively greater than the pressure inducing areas of the driving gears and increase the pressure effect of the driving gears on the driven gear.

25. A transmission mechanism, which includes driving and driven gears having intermeshing teeth, fluid filling the tooth spaces of said gears, and means adapted to urge confinement of said fluid filling the tooth spaces of meshing portions of said gears, in which mechanism the tooth spaces of the driven gear are substantially double the tooth thicknesses, and the tooth spaces and thicknesses of the driving gear are complementary thereto, whereby to establish in the driven gear pressure responsive areas, relatively greater than the pressure inducing areas of the driving gear and increase the pressure effect of the driving gear on the driven gear.

26. A transmission, which includes a bevel driving pinion, a bevel driven gear of large diameter relatively to said driving pinion axially alined with said driving pinion and spaced therefrom, an intermediate floating assembly journalling gearing meshing with said pinion and said driven gear, liquid disposed in the tooth spaces of meshing teeth of said gearing and said driven gear, and means confining said liquid against escape from said spaces to retard and prevent turning movement of said intermediate gearing relatively to said driven gear.

27. A transmission which includes a bevel driving pinion, a bevel driven gear axially alined with said pinion, an intermediate gear, disposed in floating relation to said pinion and said gear, and meshing with both thereof, fluid filling the tooth spaces of said gears, and means for retarding and preventing escape of said fluid from meshing teeth and tooth spaces of said gears.

28. A transmission mechanism, which includes a driving pinion, a driven assembly including a floating gear, reductive mechanism, including gears meshing with said pinion and said assembly gear, floating hub means housing said floating gears and in sliding contact with the face of said assembly gear, a slipping confining cup cooperating with said assembly gear, the gears of said reductive mechanism, and said hub means, to restrict and prevent fluid flow from said gears, means for controlling said cup, and a fluid filled casing housing said mechanism.

THOMAS F. LILLY.

REFERENCES CITED

The following references are of record in the file of this patent:

UNITED STATES PATENTS

| Number | Name | Date |
|---|---|---|
| 1,639,255 | Brackett | Aug. 16, 1927 |
| 1,993,988 | Barrett | Mar. 12, 1935 |
| 1,834,626 | Lilly | Dec. 1, 1931 |
| 1,273,326 | Bugenhagen | July 23, 1918 |
| 1,755,182 | Kline | Apr. 22, 1930 |
| 1,363,907 | Olson | Dec. 28, 1920 |

FOREIGN PATENTS

| Number | Country | Date |
|---|---|---|
| 576,635 | France | May 16, 1924 |